(12) United States Patent  
Sanger

(10) Patent No.: US 7,280,259 B2
(45) Date of Patent: Oct. 9, 2007

(54) METHOD FOR PRINTING A COLOR PROOF USING A SPATIAL FILTER

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1002 days.

(21) Appl. No.: 10/356,006

(22) Filed: Jan. 31, 2003

(65) Prior Publication Data

US 2004/0150844 A1 Aug. 5, 2004

(51) Int. Cl.
*H04N 1/46* (2006.01)
*G06K 9/00* (2006.01)

(52) U.S. Cl. .................. 358/504; 358/1.9; 358/2.1; 358/3.04; 358/3.05; 358/3.06; 358/534; 358/3.13; 382/167; 382/164; 382/252; 382/106

(58) Field of Classification Search ............... 358/3.01, 358/3.03, 1.9, 504, 2.1, 3.04, 3.05, 3.06, 358/534, 3.15, 3.16; 382/167, 250, 273, 382/106, 252, 113, 164; 347/43, 29
See application file for complete search history.

(56) References Cited

U.S. PATENT DOCUMENTS

| | | | |
|---|---|---|---|
| 4,630,125 A | 12/1986 | Roetling | |
| 5,164,742 A | 11/1992 | Baek et al. | |
| 5,208,871 A | 5/1993 | Eschbach | |
| 5,250,934 A | 10/1993 | Denber et al. | |
| 5,255,085 A | 10/1993 | Spence | |
| 5,258,854 A | 11/1993 | Eschbach | |
| 5,272,518 A * | 12/1993 | Vincent | 356/405 |
| 5,293,539 A * | 3/1994 | Spence | 358/527 |
| 5,321,525 A * | 6/1994 | Hains | 358/3.01 |
| 5,335,089 A * | 8/1994 | Xie et al. | 358/3.03 |
| 5,483,351 A | 1/1996 | Mailloux et al. | |
| 5,680,485 A | 10/1997 | Loce et al. | |
| 6,026,172 A * | 2/2000 | Lewis et al. | 382/106 |
| 6,115,140 A | 9/2000 | Bresler et al. | |
| 6,181,829 B1 * | 1/2001 | Clark et al. | 382/273 |
| 6,204,874 B1 | 3/2001 | Michelson | |
| 6,786,565 B2 * | 9/2004 | Pinard et al. | 347/15 |
| 2004/0066538 A1 * | 4/2004 | Rozzi | 358/2.1 |

* cited by examiner

*Primary Examiner*—King Y. Poon
*Assistant Examiner*—Steven Kau
(74) *Attorney, Agent, or Firm*—Nelson Adrian Blish

(57) ABSTRACT

The invention is a method for printing a color proof from an initial halftone bitmap file (10) having individual dots (10a, 10b, 10c, 10d) using a spatial filter (20) which is created from a calibration curve (30) for a printing press (380). The method further consists of sending an initial halftone bitmap file consisting of individual dots to the spatial filter creating a filtered output (40), quantizing the filtered output from the spatial filter to "n" levels to create a quantized image (50), transmitting the quantized image to a color printer (70), and printing a halftone color proof (80) on the color printer.

44 Claims, 9 Drawing Sheets

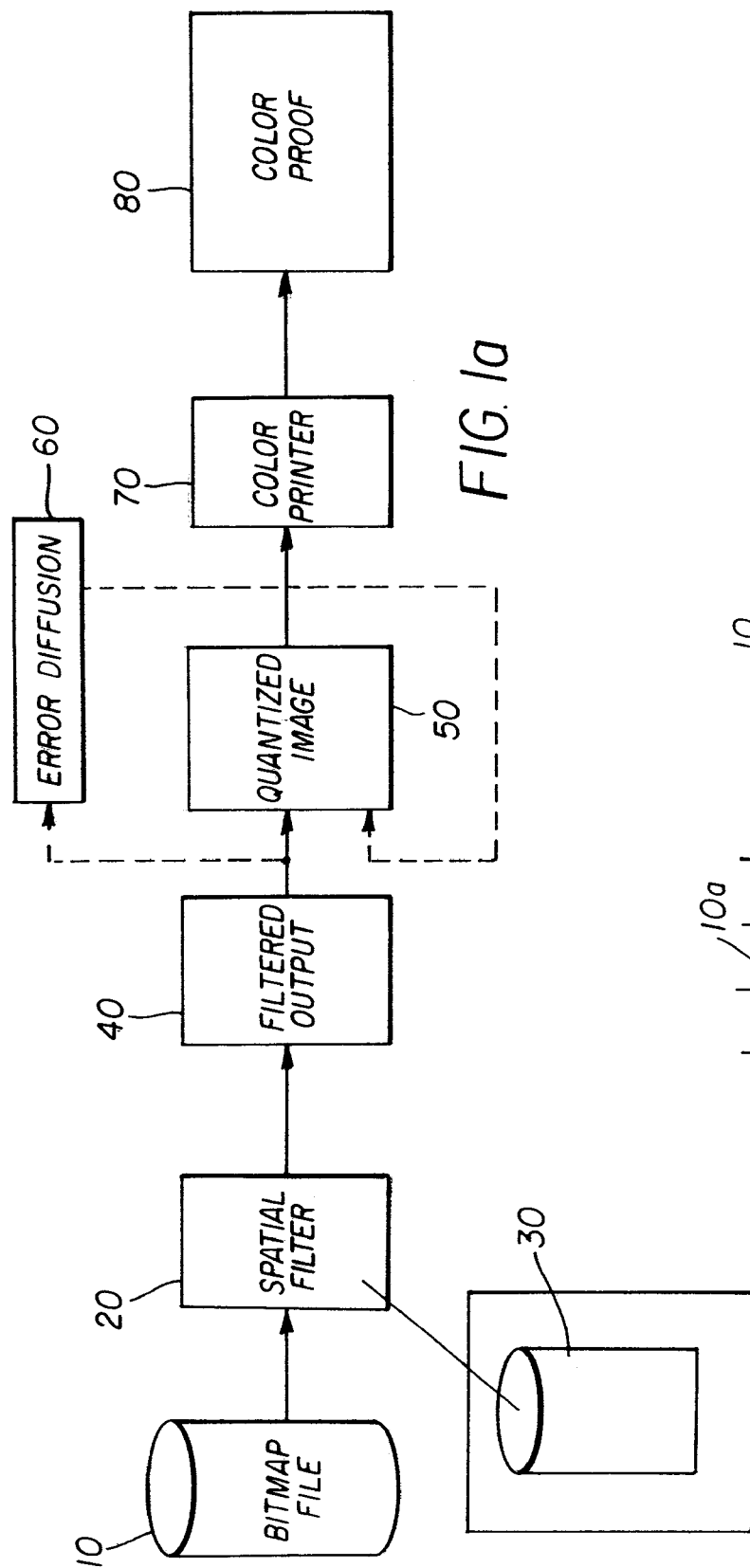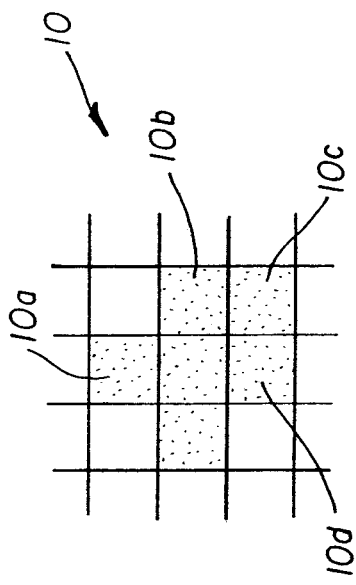

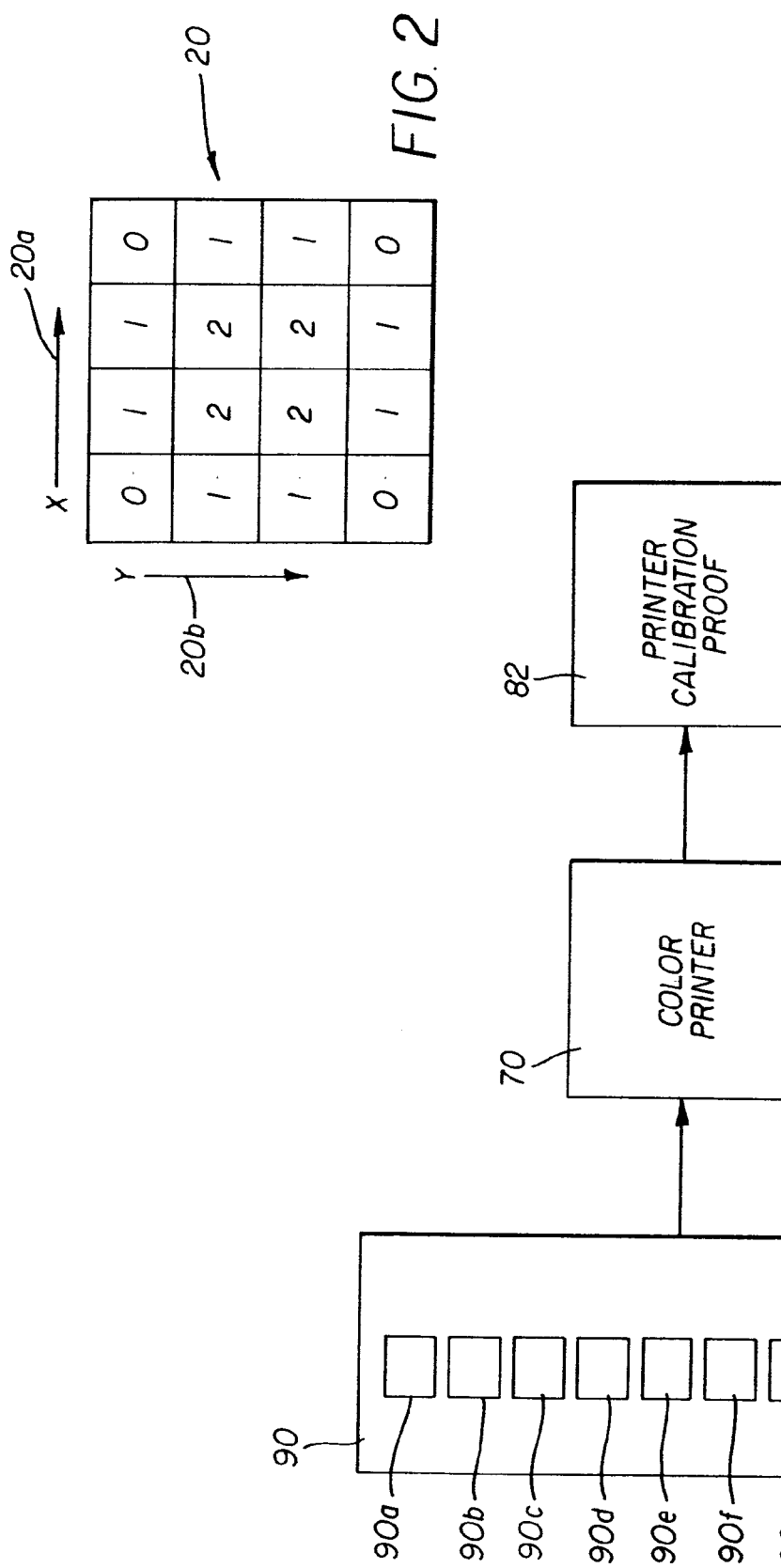

METHOD FOR PRINTING A COLOR PROOF USING A SPATIAL FILTER

CROSS REFERENCE TO RELATED APPLICATIONS

Reference is made to commonly-assigned copending U.S. Pat. application Ser. No. 10/355,600, filed Jan. 31, 2003, entitled A METHOD FOR PRINTING AN IMAGE FROM A HALFTONE BINARY BITMAP USING MULTIPLE EXPOSURES, by Sanger et al.; U.S. patent application Ser. No. 10/355,932, filed Jan. 31, 2003, entitled APPARATUS FOR PRINTING A MULTIBIT IMAGE, by Sanger et al.; U.S. patent application Ser. No. 10/355,372, filed Jan. 31, 2003, entitled METHOD OF ADJUSTING COLOR IN A COLOR PROOF, by Sanger et al.; and U.S. patent application Ser. No. 10/355,849, filed Jan. 31, 2003, entitled METHOD OF IMAGING MULTIPLE BINARY BITMAPS IN A SINGLE PASS, by Sanger et al., the disclosures of which are incorporated herein.

FIELD OF THE INVENTION

This invention generally relates to a method for printing halftone color proofs from multiple binary bitmap images and more particularly relates to a method for modifying binary bitmap images for correct dot gain.

BACKGROUND OF THE INVENTION

A need has existed to adjust color and dot gain of a binary bitmap file and image the bitmap file with the correct dot gain quickly and efficiently. The present invention is designed to use a filter to change the binary image into an images with a set of discrete "n" levels. A need has long existed for a method for adjusting the dot gain when creating color proofs from binary bitmaps.

In a digital printing workflow there is a need to be able to proof the bitmap files being used to make the printing plates. In the current process the customer artwork consisting of contone images, line work, and text, is first sent to a digital halftone proofer or inkjet printer. The artwork is corrected until the proof is approved for the press. In the case were the artwork is proofed on a digital halftone proofer such as described in U.S. Pat. No. 5,164,742, a raster image processor (RIP) adjusts the input continuous tone data using a calibration dot gain curve such that the tone-scale of the proof matches the tone-scale of the press-sheet. After the proof is approved the job is sent to a second RIP that applies a second dot gain curve for generating the plate used in the press run. The first and second RIPs are preferably the same type and version such that the halftone dots created and algorithms used by each device are an exact match. Many times the two RIPs do not match exactly. Sometimes incorrect dot gain correction files are used. Sometimes the artwork is changed between creating the proof and the plates and the press run no longer matches the approved proof.

Another disadvantage in the current system is that an error in the creation of the bitmaps for printing is not known until the plates are loaded onto the press and the press run is started. For a press capable of over 1,000 impressions per hour a considerable amount of production is lost if the plates are found to be corrupt and need to be remade.

An important aspect in creating a halftone proof is predicting dot gain or tone-scale. Dot gain is a known phenomenon attributable to ink spread, ink absorption by the print media, and optical effects between the ink and the paper. The dot gain varies with the size and shape of the halftone dots, the printing device, the inks, and the paper used, etc. For a digital proof, halftone dots in a color separation are composed of micro-pixels that give the halftone dot its shape and size. Dot gain for a digital proof corresponds to increasing dot size by adding micro-pixels. Dot loss for a digital proof corresponds to decreasing dot size by eliminating micro-pixels. Dot gain correction consists of adding and subtracting micro-pixels to match the response at different percent dot inputs.

In the printer described by U.S. Pat. No. 5,164,742 many steps are required to match the press. First, the exposure for each color plane is adjusted to match the solid area density. Second, the dot gain for each color plane is adjusted to achieve a dot gain match at different halftone tint levels. Third, the dot gain curves and density levels may be fine-tuned to achieve either a good neutral match in the three-color overprints or a specific color match such as a flesh tone. For some work other memory colors such as green grass or light blue sky may be matched as the critical color. Finally, the dot gain curves may be further adjusted to deliver better performance in the highlight, or shadow areas. These steps are critical and typically take many iterations between the proof operator and the customer to achieve the look that the customer desires. It is important to be able to adjust the proofer to achieve an acceptable appearance as there are other controls on the press that may be adjusted to affect the dot gain and tonal control of the press run. By adjusting the performance of the proofer, the customer is selecting the quality of the proofs that will be used by the pressmen to match.

Once the proofer has been setup to match the press, the customer uses subsequent proofs to setup the press. This is an important point. The proofer setup is used to simulate the press such that the pressman may then use the proofs to setup the press to achieve the customer's intent. Every job going through the proofer will be adjusted with a setup. There may be different setups for each press or press type. There may also be different setups for different customers using the same proofer. Finally, there may also be standard setups that are used to simulate jobs across many different presses.

The same job is typically ripped again when going to press. This time the RIP is programmed to generate 50% area coverage on plate for the 50% color input. The press is then run to deliver a fixed amount of gain at the 50% input level. Dot gain is due to the smearing of the ink from the plate to a blanket, the smearing of ink from the blanket to the job paper, and the optical gain of the ink on top of the paper. The control is usually split between the plate-making device delivering 50% area coverage for a 50% input, and the press delivering 50% plus its intrinsic dot gain. Typical dot gain levels for a web-fed offset press are 15% to 25% at the 50% input level. Because the dot gain occurs on the press instead of at the plate writer the bitmaps used to create the plate will not contain enough gain to make the proof. Proofs made from these bitmaps will be washed out and the contrast will be significantly reduced. Colors will also shift, as the gain in each color will be proportional to the dot area coverage.

Other digital halftone printing devices such as that disclosed in U.S. Pat. No. 6,204,874 use a binary proofing media that does not allow for adjusting the density level of the solid colorants. A different process is used to adjust these devices for a close press match, including adjusting the tone-scale or dot gain curve used to make the bitmap file. However, the ideal dot gain curve on these systems is still different from the dot gain curves used to make the plates.

Even if the same machine is imaging the plate and the proof as disclosed in U.S. Pat. No. 6,204,874.

Inkjet printing devices are also sometimes used to make a proof. These devices typically image from 300 dpi to 1440 dpi writing resolutions using multiple cyan, magenta, yellow, and sometimes black inks. In addition software such as "Best Screen Proof" available from Best GmbH, or Black Magic available from Serendipity Software Pty. Ltd., may be used to simulate the printing of a halftone screen. This software attempts to measure the halftone screen and adjust the printed output to achieve a close color match to a given target. Resolution of the inkjet devices does not allow for a good match of the halftone dot structure. The color match developed does simulate the tone-scale or dot gain correction, but only through the driving of the overlapping colors on the proof. The quality of the halftone in the printed proof is significantly compromised. Dots in the highlight and shadow areas are destroyed in trying to match the overall density level in these systems. This is because the inkjet output drops are too large. Therefore, one inkjet drop is used to replace many halftone dots in the highlight or bright areas, while one inkjet hole is used to replace many halftone holes in the shadows.

A halftone screen at 150 lines per inch, six lines per mm, covers an area of approximately 28,674 um$^2$. An inkjet printer with a 3 pL drop size will produce a dot with a diameter of about 25 um covering an area of 625 um$^2$. This may vary depending upon the spread into the paper. A single inkjet drop represents a 2.18% change in area within a 150-line screen halftone. To achieve finer resolution the Best Screen Proof, and Black Magic software use additional inks to image multi-level colorants. Typically a light cyan and light magenta ink are added to the cyan, magenta, yellow, and black primaries to achieve finer control of the tone-scale. While this creates a proof with a close visual color match, the structure of the halftone dots within the image is seriously degraded.

A conventional proofing solution, for example a direct digital color halftone Proofer, processes the file for proofing at 2540 dpi separate from ripping the file for printing, adding dot gain to the proofing file as part of the ripping process. U.S. Pat. No. 5,255,085 discloses a method to adjust the tone reproduction curve of a press or output printer. This creates a target from the press or desired output proof, benchmarks the characteristics of the proofing device, and generates a lookup table to adjust the dot gain of the original file to achieve the aim on the proofing device. U.S. Pat. No. 5,293,539 adds adaptive process values to interpolate between measured benchmark and aim data sets to calibrate the dot gain tone-scale curve at other screen rulings, screen angles, and dot shapes. Utilizing these techniques to modify the dot gain curves and hence the tone-scale curves of the proofing device increases the chances for error. The input file and its subsequent components must be available for both RIPs. The same versions of each file and components must be specified. The same fonts must be available for both RIPs. The correct dot gain curve must be specified at both RIPs. The chances for error to occur increase with each ripping operation, especially when the RIPs are located at separate sites.

Ripping the file twice is also time consuming. Each RIP operation must read the input files, decide where each of the components is to be placed in the output print, convert continuous tone images using the correct dot gain curve into high resolution halftones, render text and line work, and output a high resolution bitmap which represents the composite image. This is repeated for each color in the output print.

The current direct digital color halftone proofers implement dot gain by modifying the code values being printed through a curve prior to converting the code values into the halftone bitmap with the RIP. The dot gain is only applied to the continuous tone image data and not the line work or text. The dot gain may be adjusted for each of the primary colors cyan, magenta, yellow, and black. A dot gain curve may also be specified for spot colors orange, green, red, blue, white, and metallic. A dot gain curve may also be specified for a recipe color that is imaged using a single bitmap in combination of two or more standard colors at unique exposure levels. A dot gain curve may also be specified for each colorant within a recipe color. In this last case more than one bitmap is used, however the halftone dots are at the same screen ruling, screen angle, and phase, such that each halftone dot in each color substantially overlap.

The dot area is calculated using the Murray-Daives Equation, defined in ANSI/CGATS, 4-1993, 1993, p. 7. Equation 1. Murray-Daives Equation to calculate percent dot area.

$$\text{PercentArea} = (10^{-D_{tint}} - 10^{-D_{paper}})/(10^{-D_{solid}} - 10^{-D_{paper}}).$$

A typical example is that a target curve is known. Such a target might specify that the 50% cyan halftone should print at 67%, the 25% cyan halftone should print at 35%, and the 75% cyan halftone should print at 80%. A benchmark proof is then run and measured. Measurement may be taken at 30%, 60%, and 79% cyan dot area coverage at the 25%, 50%, and 75% input levels. A dot gain adjustment curve is then created to add the correct amount to cyan to achieve the target values at the target inputs. For instance in this example, an output value of 35% was achieved at an input level of 30% in the benchmark proof. Therefore, a 5% dot gain at the 25% input level was added to achieve the 35% target. At the 50% level the target level of 67% was achieved at an input level of 57% requiring an added 7% at the 50% input. At the 75% level the 80% target at the 76% input requiring 1% dot gain was achieved. In actual practice, the dot gain in 5% or 10% steps was measured with some additional measurements between 0 to 10% and 90 to 100%. A spline curve is usually fit to the resulting dot gain curve to provide a table in 1% input increments or less. Smoothing is sometimes performed on the input target and benchmark data to further reduce artifacts in the adjustment process.

Perup Oskofot has shown a software program, which operates on high resolution scans from their scanners. The program takes a binary high-resolution scan of a halftone film and de-screens it to a lower resolution continuous tone image. Typically the scan resolution is 2400 dpi. The resulting continuous tone image may be 8-bits per pixel at 300 dpi resolution. A dot gain curve is then applied to the de-screened image. The adjusted image is then reripped to a bitmap image at 2400 dpi. One problem with this method is that it requires a reripping step. To accomplish this requires a RIP. Knowledge of what the original halftone screen shape, screen ruling, and screen angle are necessary in order to faithfully reproduce it with the re-ripping step. Another problem is that all RIPs are not the same. There are subtle differences between them such as the method that they use to add noise to hide the quantization affects in screening the image. This means that one RIP may not sufficiently reproduce all the screens that the customer might digitize. Another problem with this method is that it is extremely slow. A small 8×10 inch image at 2400 dpi scanned resolution may take more than an hour to process a single color plane.

Additionally, some customers have halftone films, which they would like to use in their digital workflow. These customers scan the film at a high resolution, 100 pixels/mm, and quantize each pixel to a binary value. Because the dot gain is built into the film, there is no method other than de-screening the bitmap file, adding dot gain, and reripping the file, to calibrate the output print. If the original film was made using an optical technique then the dot shape, screen ruling, and screen angle may not be an exact match to a digital RIP. De-screening and re-screening the high-resolution scan may not faithfully reproduce the original screens.

U.S. Pat. No. 5,250,934 discloses a method of shifting and adding a bitmap image with itself to thin the image displayed. U.S. Pat. No. 5,250,934 also discloses a method of setting a bit to an intermediate level if it is diagonally between two active bits using shifting logical.

U.S. Pat. No. 5,483,351 discloses using a 4×4 input to a lookup table to determine how to operate on the central 2×2 pixels to implement half bit or full bit dilation and erosion. U.S. Pat. No. 5,483,351 has the advantage of knowing some of the surrounding pixels in deciding how to dilate or erode the pixels in the center.

U.S. Pat. No. 5,258,854 teaches how to resize bitmap images in small amounts less than one full bit in size. U.S. Pat. No. 5,680,485 also discloses logically combining two morphological filter pairs and an original image to create an output image. The morphological filters described are erosion filters, one of which has less erosion than desired and the other having more erosion than desired. Logically combining combinations of the original image with the two eroded images provides for a method of obtaining an intermediate result.

U.S. Pat. No. 5,208,871 describes a method of resizing an input bitmap in. U.S. Pat. No. 5,208,871 simulates a scan of an output image from an input bitmap such that the scan resolution is different from the input bitmap. Error diffusion is utilized to quantize the output bitmap into the desired output bit resolution. This example uses error diffusion to spread out the error in the quantization of a multilevel pixel into a reduced number of output states.

U.S. Pat. No. 6,115,140 uses a de-screened version of an original image, and dilated and eroded versions of the original image to select a combination of the original, dilated, and eroded images to effect a dot gain or tone-scale change in an input bitmap image. U.S. Pat. No. 6,115,140, FIG. 5B, shows an original halftone image input into block HI along with an eroded version (HE), and two dilated versions (HD1 and HD2). Then a weight based on de-screened versions of the original halftone (CO), the color corrected original (CI), the eroded original (CE), and the two dilated originals (CD1 and CD2) is calculated. The de-screened images are used to select which of the four halftone images, HI, HE, HD1, and HD2, are transferred into H1 and H2. The weighting function is then used to merge bitmap versions of H1 and H2 together into the tone-scaled output bitmap (HO). How to de-screen is not disclosed, nor exactly how to calculate which bit of H1 and H2 is used to drive the output bit HO. The need to use error diffusion to distribute the error in selecting between H1 and H2 is not mentioned.

In U.S. Pat. No. 4,630,125 dilation is described as growing a single pixel completely around the halftone feature. A second dilation grows two pixels completely around the halftone feature. Similarly erosion subtracts a single pixel completely around the halftone feature.

U.S. Pat. No. 4,630,125 does not teach how to perform de-screening. Roetling performs de-screening by comparing the number of white and dark pixels within a specified area in U.S. Pat. No. 4,630,125. U.S. Pat. No. 4,630,125 also states "A partial solution known in the art is to spatially filter the halftone image with a low pass filter." U.S. Pat. No. 4,630,125 teaches that the spatial filter method is not exact as it tends to blur the original image.

All of the above techniques adjust the dot gain of the binary bitmap files by adding or subtracting micro-pixels. This changes the size of the halftone features in the bitmaps.

Thus, there exists a need for optimizing the process of adding dot gain while maintaining dot fidelity. A system that adds dot gain to the bitmaps used to make the printing plates and proofs these bitmaps so that the press-sheets made with same printing plates are known prior to running the plates on press does not exist.

SUMMARY OF THE INVENTION

The invention is a method for printing a color proof from an initial halftone binary bitmap file. The method involves modifying an initial halftone bitmap file having individual dots using a digital filter to affect a calibration curve for printing. Other methods involve creating the digital filter from bitmaps imaged on press and on the printing apparatus. The bitmaps used to create the digital filter may be horizontal and/or vertical. The method continues by imaging the proofer bitmap on a proofer to form a printed line scale, measuring the line scale areas to identify the area that most closely match the line press target, and printing a line scale from 10 to 100% on a proofer having a set of proofer halftone bitmaps. The method ends by using the target bitmap with the identified proofer bitmap area to create a spatial filter and sending an initial halftone bitmap file having individual dots to the spatial filter forming a filtered output.

BRIEF DESCRIPTION OF THE DRAWINGS

FIG. 1a is a diagrammatic view of a first embodiment of the unique method of the invention.

FIG. 1b shows the initial halftone bitmap with dots used in the invention.

FIG. 2 is a detailed view of the spatial filter used in the invention.

FIG. 3 is a test target with the percent dot request between 10 and 100%.

DETAILED DESCRIPTION OF THE INVENTION

Figure 4A:
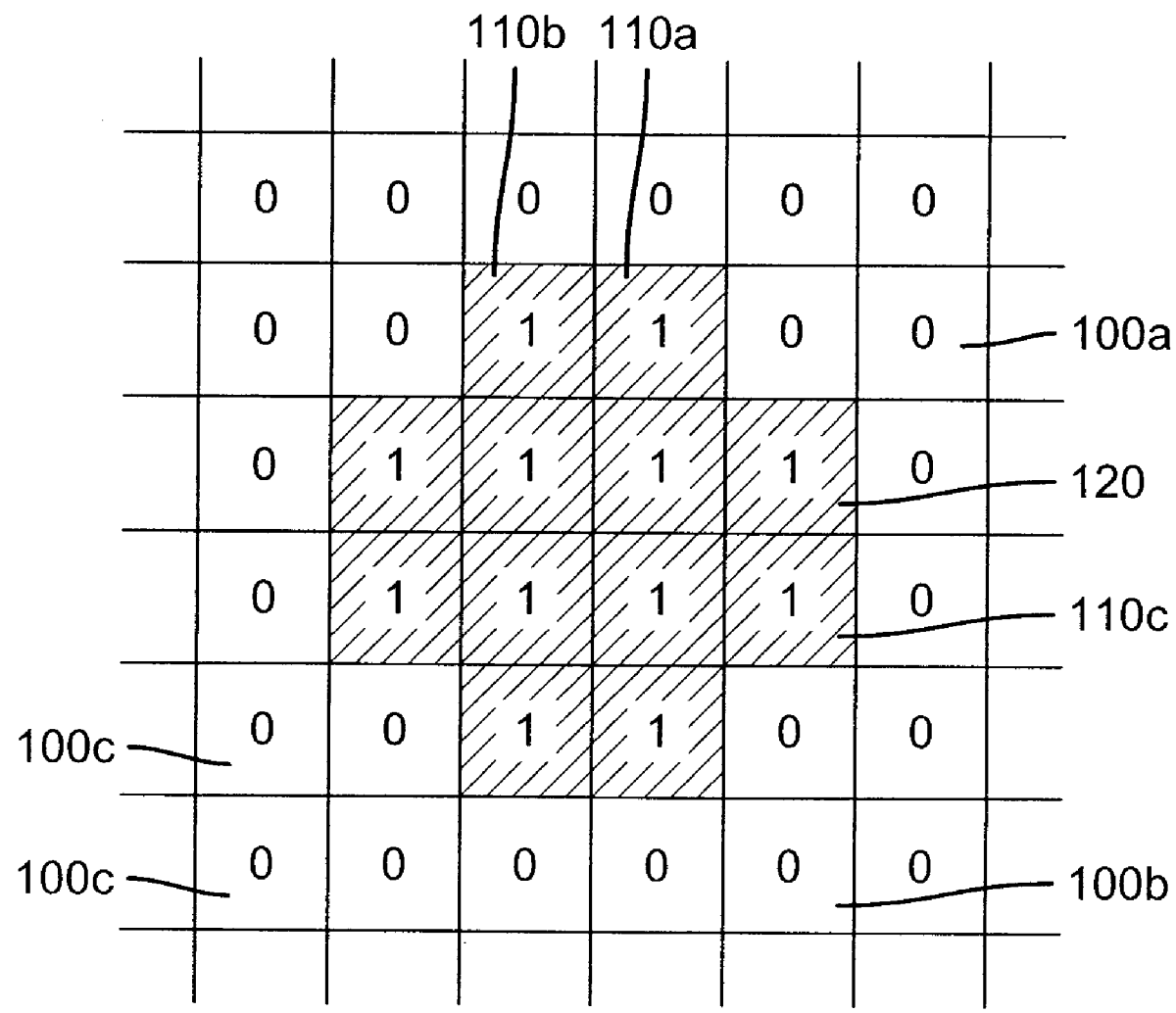
FIG. 4a shows an original halftone bitmap.

The invention has been described in detail with particular reference to certain preferred embodiments thereof, but it will be understood that variations and modifications can be effected within the spirit and scope of the invention. Referring to the drawings wherein like reference numerals represent identical or corresponding parts throughout the several views.

Referring to FIG. 1a, the invention relates to a method for printing a color proof 80 from an initial binary bitmap file 10 comprising: creating a calibration curve 30 for a printing press with a defined dot gain or dot loss per percent dot input. Next, a spatial filter 20 is created. FIG. 1b shows the initial binary bitmap file 10 preferably consisting of individual dots 10a, 10b, 10c, and 10d, which is transmitted to the spatial filter 20 creating a filtered output 40. The next step involves quantizing the filtered output 40 to "n" levels, which is preferably about 16 levels shown in FIG. 4a, FIG. 4b, and FIG. 4c with one level being off to create a quantized image 50. The quantized image 50 is then transmitted to a color printer 70 then imaged creating the color proof 80. (The error diffusion step 60 is optional and is discussed below.)

FIG. 2 provides a detail on the spatial filter 20. In a preferred embodiment, the spatial filter is a two dimensional filter which first filters the bitmap file in an x direction 20a and then in a y direction 20b. In a preferred embodiment, the two-dimensional filter simultaneously filters the halftone bitmap file in an x and y direction simultaneously. The example in FIG. 2 is a 4 pixel by 4 line digital filter with the coefficients specified in the figure. In this example the pixel direction is the x direction and the line direction is the y direction.

It is contemplated to be within the scope of the invention that this method can be used to increase the intensity of the edges of the individual dots of the initial halftone bit mat, by exposing the dots at an exposure greater than an average exposure of dots in the initial halftone bitmap. Alternatively, the individual dot exposure can be adjusted to be greater than the average exposure of dots in the initial halftone bitmap.

The calibration curve 30 can be created by known methods, such as those described in U.S. Pat. Nos. 5,255,085 and 5,293,539. Percent dot area is calculated using the Murray-Davies equation from measured densities. Dot gain is calculated by subtracting the measured dot area from the initial dot area requested thereby measuring gain in calculated dot area.

FIG. 4a shows an initial binary bitmap file 10. Each pixel is shown as on or off. Off pixels are shown as 100a, 100b, and 100c. "On" pixels are shown as 110a, 110b, and 110c. The "on" pixels, 110a, 110b, 110c and so on represent a halftone dot 120.

Figure 4B:
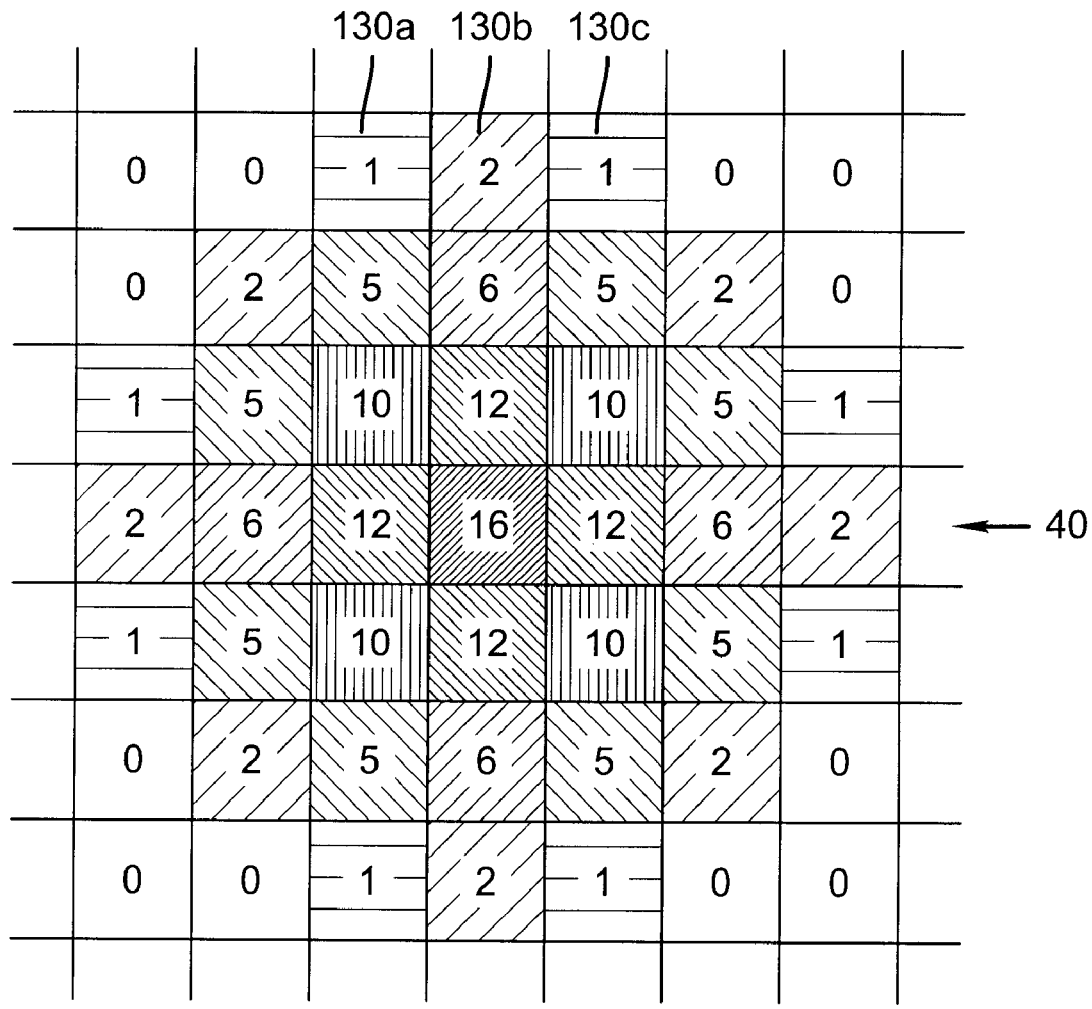
FIG. 4b shows a filtered halftone bitmap.

FIG. 4b shows a filtered output 40 created by filtering the initial binary bitmap file 10 with the spatial filter 20. The filtered output 40 is depicted using shaded pixels, which represents a different level of intensity from the output of the filter. Filtered pixels 130a, 130b, and 130c, are filtered from the initial binary bitmap into a continuous image. These pixels are real numbers or an integer with defined resolutions. The same numbers of dots per inch exist, that is, the spatial resolution between pixels is identical. Each pixel is now represented by a "gray level."

Figure 4C:
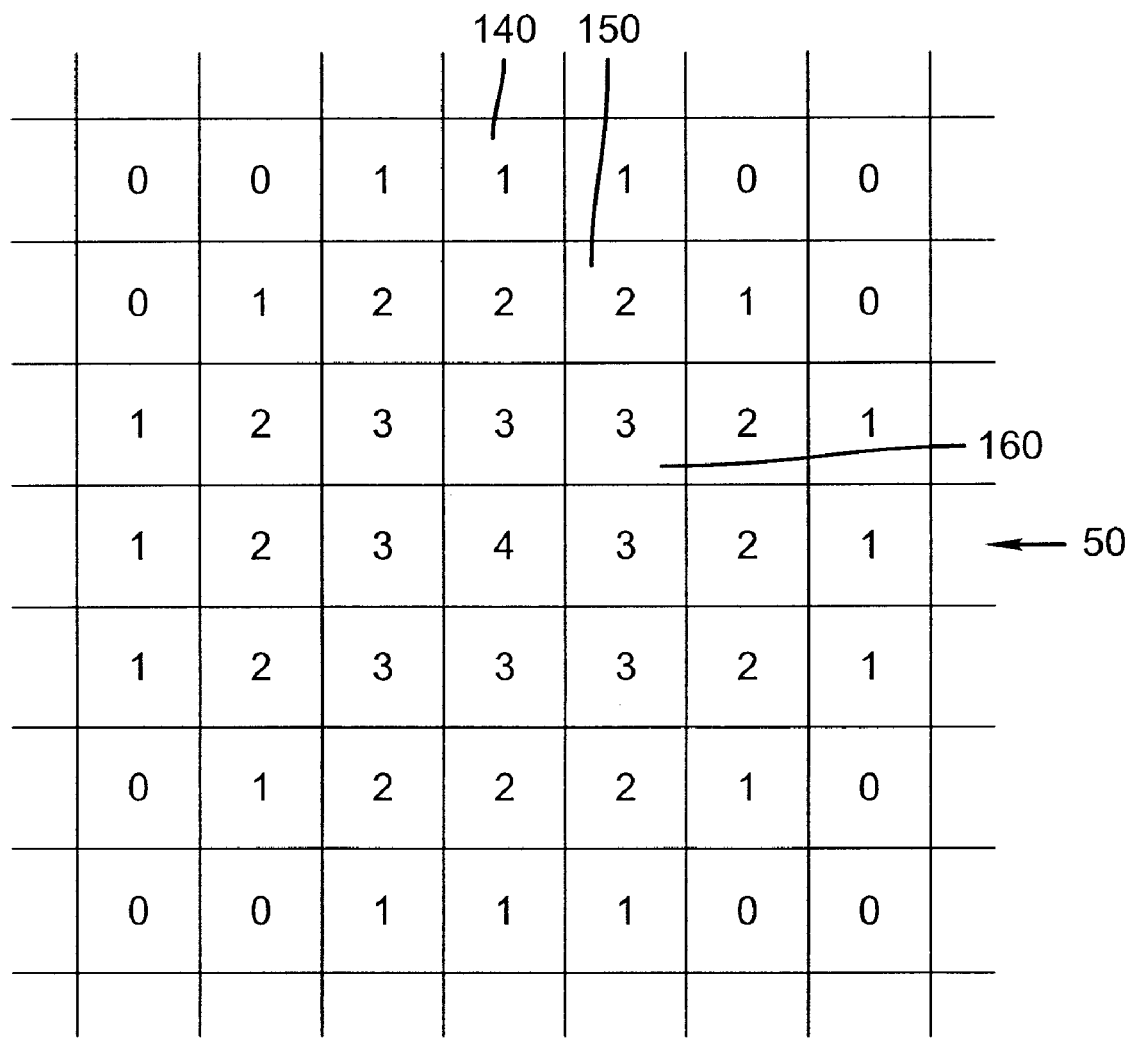
FIG. 4c shows the bitmap quantized to 4-bits per pixel.

FIG. 4c shows the quantized bitmap 50 having been quantized to n bits per pixel, with the quantized pixels identified as 140, 150, and 160. The quantized bitmap 50 is the result of limiting the filtered output 40 to "n" discrete levels. The invention contemplates using "n" levels of the quantized output, and the most preferred embodiment has 16 levels with one of the 16 levels as "off." Limiting the output to 16 levels allows us to represent the quantized bitmap 50 using just 4-bits per pixel.

Returning to FIG. 1a, the method can also include the additional step of performing error diffusion 60 simultaneously with the quantizing of the filtered output to hide any quantization defect. Once the image is quantized the difference between the filtered pixel and the quantized pixels is called an error signal. For instance if quantization levels consisted of the set {0.00, 0.25, 0.50, 0.75, 1.00, 1.25, 1.50, 1.75, and 2.00} and if the filtered pixel had a value of 1.12 and the quantized pixel had a value of 1.00 then the error when printing the quantized pixel is +0.12 indicating that the print is short a level of 0.12 density. When error diffusion is employed each quantized pixel in the quantized image 50 is compared to the filtered output 40 and the error is added to the next pixel prior to quantization. In the present example the error level of +0.12 is added to the next pixel prior to quantization. If the next filtered pixel were 1.10 then 0.12 would be added to obtain 1.22 and quantized to 1.25. The error for the next filtered pixel would be −0.03. This diffuses the error in the quantized image (50) blurring the quantization error and creating a more pleasing result.

Referring to FIG. 3, first image a printer calibration target 90 on printer 70 to create a printer calibration proof 82. The printer calibration target 90 is shown in FIG. 3 to consist of tint patches from 10% 90a, 20% 90b, continuing to 100% 90j. For this example the present invention has not shown patches using 1% increments but may choose to use a smaller percent tint increment on the printer calibration target. The present invention may also optimize the target to cover a smaller percent dot range using a finer percent dot increment per patch. For instance, choosing to image 50% to 70% tints in steps of 0.25%. The printer calibration target is measured and the dot gain for each patch is calculated. The patch that created the measured percent dot for a desired 50% input dot in the calibration curve 30 is identified as patch A. The bitmap for patch A is used along with the bitmap for a 50% dot to compute the spatial filter 20. For a 5 pixel by 5 line digital filter a Fourier transform is performed on a 5 pixel by 5 line area within the patch A bitmap to create the patch A transform. The present invention also performs a Fourier transform on the same 5 pixel by 5 line area within the 50% tint to obtain the 50% tint transform. The present invention divides the patch A transform by the 50% tint transform to obtain the filter transform. Then the magnitude of the inverse Fourier transform of the filter transform is taken to obtain the coefficients of the spatial filter 20.

In the preferred embodiment the color printer images at a high resolution between 1400 and 4000 dpi. The color printer is capable of imaging using multiple levels per colorant. Ideally at least 4 levels per color are available and 16 is the minimum recommend number of discrete levels. The color printer should have a written pixel size of 4 um$^2$ up to 900 um$^2$ to fully utilize the writing resolution. The color printer should have the ability to image at least two colors at each of the 4 levels, one color on top of the other color to form a solid recipe color. Such a printer is considered to be "recipe color enabled" because it may image multiple colorants at multiple levels within a single pixel to create a recipe color on the print.

Figure 5:
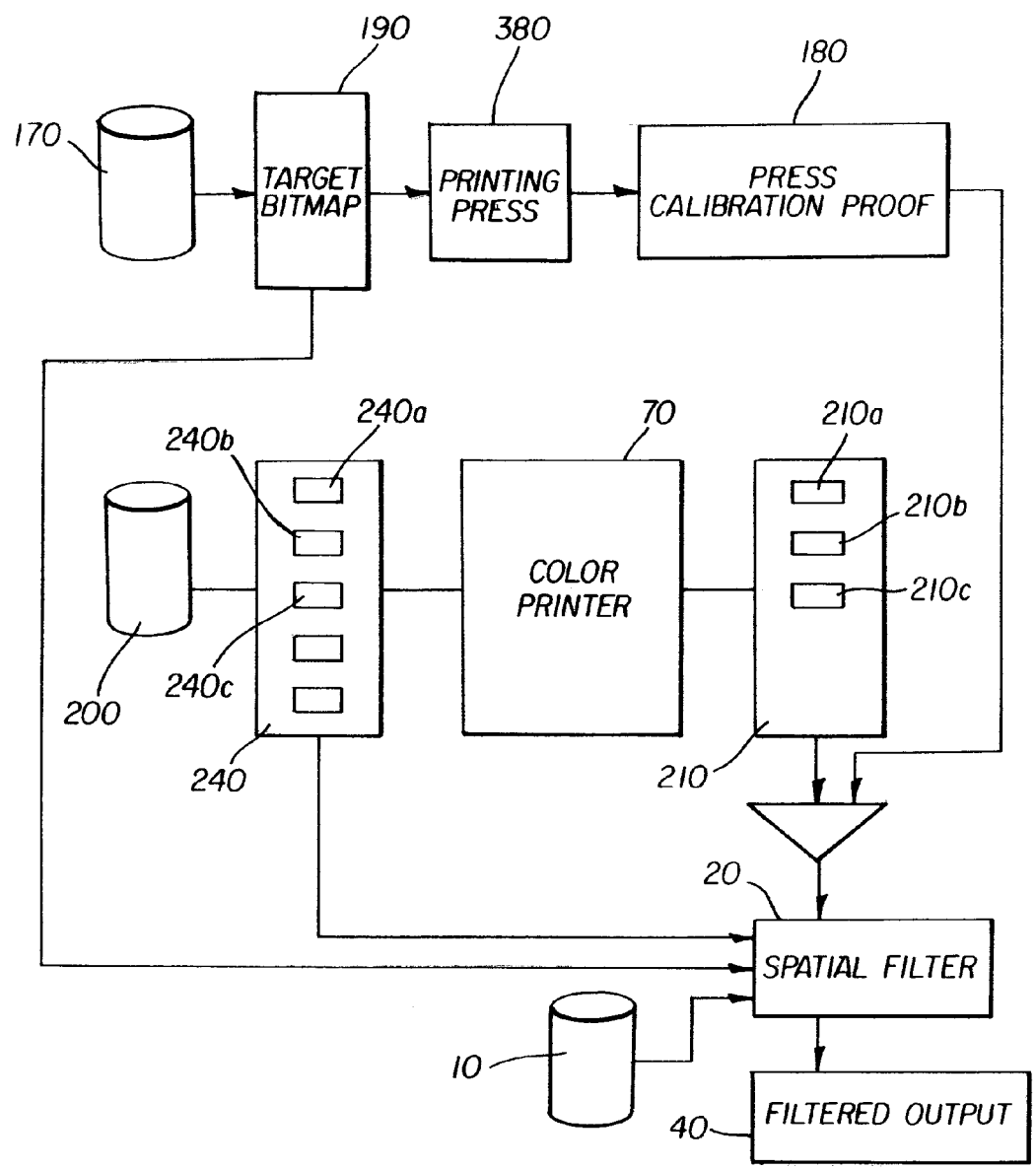
FIG. 5 is a second embodiment of the method of the invention.

Continuing to FIG. 5, which shows a second embodiment of the method of the invention for printing a color proof from an initial halftone bitmap file comprising the steps of first, creating a solid tint press calibration proof 180 from a target bitmap 190 for a printing press 380. The target bitmap 190 is created from a digital file of a 10% to 75% solid tint press target 170. The invention has as its preferred embodiment, using a 50% solid tint press target 170.

The next step involves creating a proofer bitmap 240 of a digital tint scale 200. Imaging the proofer bitmap 240 on a color proofer 70 to make a printed tint scale 210.

In all the methods of the present invention, the printing press can be one that is sheet fed, or web fed. It is also contemplated that the press could be a single color press or a multicolor press, such as a 4-color press. In yet another embodiment of the invention it is contemplated that the color printer is a single pass recipe color enabled printer.

The printed tint scale 210 has areas 210*a*, 210*b*, and 210*c* that correspond to proofer bitmap areas 240*a*, 240*b* and 240*c*. The areas 210*a*, 210*b*, and 210*c* are measured. One proofer bitmap area, such as 240*a*, is identified as the one that most closely matches the press calibration proof 180.

The patch that created the measured percent dot for a desired press calibration proof 180 is identified as patch B. The bitmap for patch B identified as one of 240*a*, 240*b*, etc. is used along with the target bitmap 190 to compute the spatial filter 20. For a 5 pixel by 5 line digital filter a Fourier transform is performed on a 5 pixel by 5 line area within the patch B bitmap to create the patch B transform. The present invention also performs a Fourier transform on the same 5 pixel by 5 line area within the target bitmap 190 to obtain the target transform. Divide the patch B transform by the target transform to obtain the filter transform. Then take the magnitude of the inverse Fourier transform of the filter transform to obtain the coefficients of the spatial filter 20. While the target bitmap 190 is a bitmap of a solid tint, and the proofer bitmap areas are individual areas of solid tints, care is taken so that the corner of each tint area in the proofer bitmap is in phase with the halftone dots in the target bitmap such that one corner of each bitmap area 240*a*, 240*b*, and 240*c* corresponds to the same corner of target bitmap 190.

It is also possible that the best match to the press calibration proof 180 falls between proofer bitmap areas 240. For this case, create a mathematical match by interpolating between the two closest bitmaps to create the patch B bitmap.

The target bitmap 190 is used with the selected proofer bitmap area (in this instance, 240*a*) to make a spatial filter 20. The initial binary bitmap file 10 is then transmitted to the spatial filter 20 forming a filtered output 40 as shown in FIG. 1*a*.

Filtered output 40 is quantized to "n" levels, in the same manner as shown in FIG. 4*a*, FIG. 4*b*, and FIG. 4*c* of the first embodiment of the method to create a quantized image 50. The quantized image is then transmitted to a color printer 70 and printing a halftone color proof 80 on the color printer.

As with the first embodiment, this method contemplates using a two-dimensional filter as the spatial filter, preferably where the filter first filters the bitmap file in an x direction and then in a y direction. This second embodiment also contemplates that the two-dimensional filter simultaneously filters the halftone bitmap file in an x and y direction simultaneously.

Figure 6:
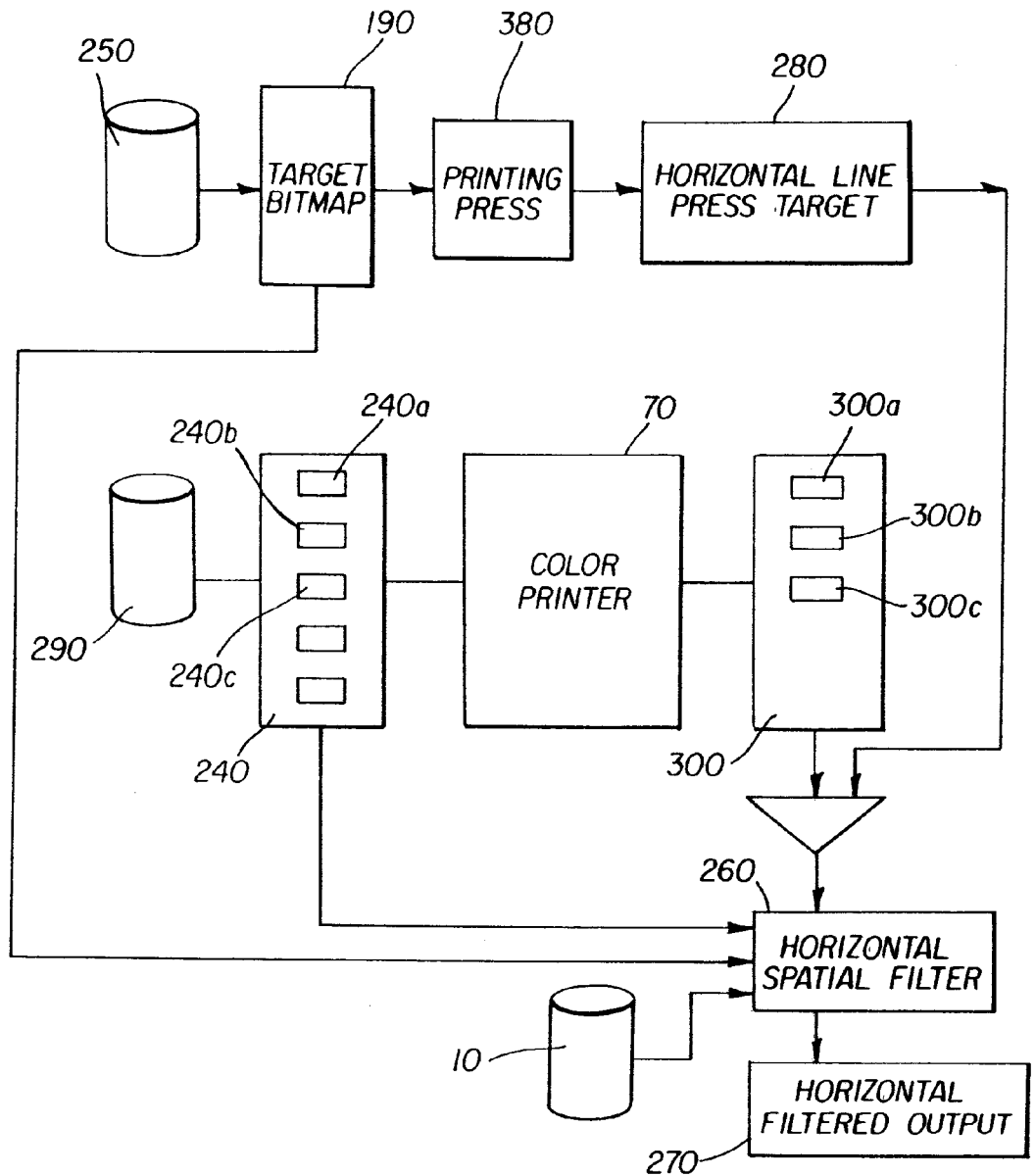
FIG. 6 is a third embodiment of the method of the invention.

FIG. 6 shows a third embodiment of the present invention for printing a color proof from an initial halftone bitmap file which has a plurality of steps including creating a horizontal line press target 280 for a printing press 380 from a target bitmap 190 of the horizontal line target 250. The horizontal line target 250 consists of horizontal lines with an area coverage between 10% and 75%. The invention has as its preferred embodiment using a 50% horizontal line target 250.

The nest step involves creating a proofer bitmap 240 of a digital horizontal line scale 290. Imaging the proofer bitmap 240 on a color printer 70 to make a printed horizontal line scale 300. The printed horizontal line scale 300 has areas 300*a*, 300*b*, and 300*c* that correspond to proofer bitmap areas 240*a*, 240*b*, and 240*c*.

The areas 300*a*, 300*b*, and 300*c* are measured. One proofer bitmap area such as 240*a* is identified as the one that most closely matches the horizontal line press target 280.

Next, the target bitmap 190 is used with the selected proofer bitmap area, one of 240*a*, 240*b*, 240*c*, etc. to make a horizontal spatial filter 260. The area on the printed horizontal line scale 300 which is closest to the horizontal line press target 280 is identified as Patch C. For a 1 pixel by 5 line digital filter a Fourier transform is performed on a 1 pixel by 5 line area within the patch C bitmap to create the patch C transform. The present invention also performs a Fourier transform on the same 1 pixel by 5 line area within the target bitmap 190 to obtain the target transform. The present invention divides the patch C transform by the target transform to obtain the filter transform. Then the magnitude of the inverse Fourier transform of the filter transform is taken to obtain the coefficients of the horizontal spatial filter 260.

It is also possible that the best match to the horizontal line press target 280 falls between proofer bitmap areas 240*a*, 240*b*, 240*c*. For this case, create a mathematical match by interpolating between the two closest bitmaps to create the patch C bitmap.

The initial binary bitmap file 10 is then sent to the horizontal spatial filter 260 forming a horizontal filtered output 270. The horizontal filtered output 270 is then quantized to "n" levels as shown in FIG. 4*a*, FIG. 4*b*, and FIG. 4*c* and as described in the first method above, to create a quantized image 50.

The quantized image 50 is then transmitted to a color printer 70 and a halftone color proof 80 is printed on the color printer. In this method, an additional step is contemplated of performing error diffusion in the horizontal direction simultaneously with the quantizing of the output to hide any quantization defect.

Figure 7:
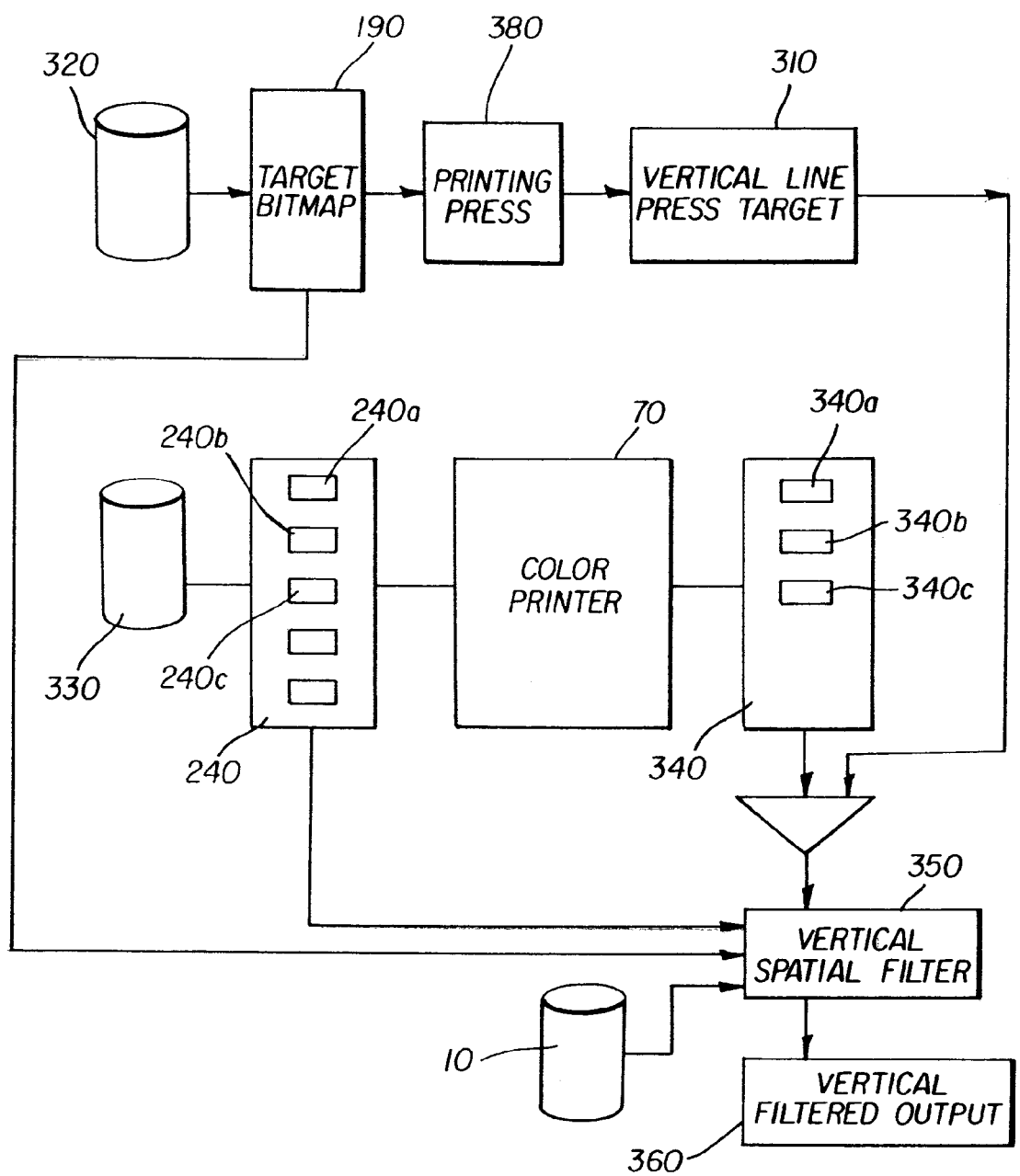
FIG. 7 is a fourth embodiment of the method of the invention.

FIG. 7, shows a third embodiment of the invention for printing a color proof from an initial binary bitmap file 10 which has a plurality of steps including creating a 10-75% vertical line press target 310 for a printing press 380 from a target bitmap 190 of the vertical line target 320. A target bitmap 190 is created from a digital file of a vertical line target with a percent line width from 10% to 100%. The invention has as its preferred embodiment using a 50% vertical line target 320.

The next step involves creating a proofer bitmap 240 of a digital vertical line scale 330. Imaging a proofer bitmap 240 on a color printer 70 to make a printed vertical line scale 340. The printed vertical line scale 340 has areas 340*a*, 340*b*, and 340*c* that correspond to proofer bitmap areas 240*a*, 240*b* and 240*c*.

The areas 340*a*, 340*b*, and 340*c* are measured. One proofer bitmap area such as 240*a* is identified as the one that most closely matches the vertical line press target 310.

Next, the target bitmap 190 is used with the selected proofer bitmap area to make a vertical spatial filter 350. The area on the printed horizontal line scale 340 which is closest to the horizontal line press target is identified as Patch D. For a 5 pixel by 1 line digital filter a Fourier transform is performed on a 5 pixel by 1 line area within the patch D bitmap to create the patch D transform. The present invention also performs a Fourier transform on the same 5 pixel by 1 line area within the target bitmap 190 to obtain the target transform. The present invention divides the patch D transform by the target transform to obtain the filter transform. Then the magnitude of the inverse Fourier transform of the filter is taken to transform to obtain the coefficients of the digital filter 350.

It is also possible that the best match to the vertical line press target 310 falls between proofer bitmap areas 340a, 340b, 340c. For this case, create a mathematical match by interpolating between the two closest bitmaps to create the patch D bitmap.

The initial halftone bitmap file 10 is then sent to the vertical spatial filter 350 forming a vertical filtered output 360. The vertical filtered output 360 is then quantized to "n" levels as shown in FIGS. 4a, 4b, and 4c and as described in the first method above, to create a quantized image 50.

The quantized image 50 is then transmitted to a color printer 70 and a halftone color proof 80 is printed on the color printer.

Figure 8:
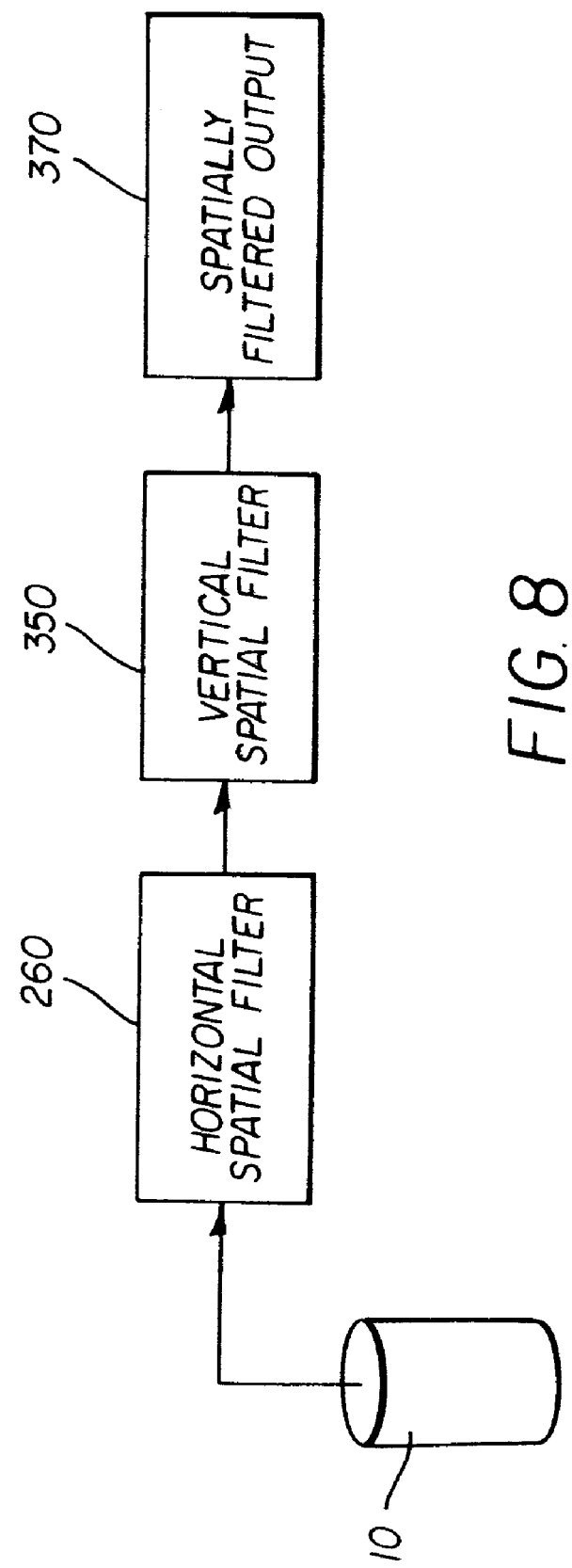
FIG. 8 is a fifth embodiment of the invention.

The final embodiment of the present invention tracks all of the steps described in FIG. 6 and all of the steps of FIG. 7 to create the horizontal spatial filter 260 and the vertical spatial filter 350. FIG. 8 shows that the initial halftone bitmap is introduced to the horizontal spatial filter 260 then the vertical spatial filter 350 to create a spatially filtered output 370. The spatially filtered output 370 is then quantized to "n" levels as shown in FIG. 4a, FIG. 4b, and FIG. 4c and as described in the first method above, to create a quantized image 50. The quantized image 50 is then transmitted to a color printer 70 and a halftone color proof 80 is printed on the color printer.

In particular the method includes the specific steps:
a) creating a 10%-75% horizontal line press target for a printing press having a target bitmap and then creating a 10%-75% vertical line press target for a printing press having a target bitmap;
b) printing a horizontal line scale from 10% to 100% on a proofer having a set of horizontal proofer halftone bitmaps and then printing a vertical line scale from 10% to 100% on a proofer having a set of vertical proofer halftone bitmaps;
c) measuring a horizontal line scale from the proofer and identifying a horizontal proofer bitmap from the set of horizontal proofer bitmaps that matches the 10%-75% horizontal line target, and then measuring a vertical line scale from the proofer and identifying a vertical proofer bitmap from the set of vertical proofer halftone bitmaps that matches the 10%-75% vertical line target;
d) use the horizontal target bitmap with the identified horizontal proofer bitmap to create a horizontal spatial filter and then use the vertical target bitmap with the identified vertical proofer bitmap to create a vertical spatial filter;
e) sending an initial halftone bitmap file to the horizontal spatial filter forming a horizontal filtered output,
f) sending the horizontal filtered output to the vertical spatial filter forming a spatially filtered output;
g) quantizing the spatially filtered output to "n" levels to create a quantized image;
h) transmitting the quantized image to a color printer; and
i) printing a color proof on the color printer.

In this method, an additional step is contemplated of performing error diffusion in the vertical direction simultaneously with the quantizing of the output to hide any quantization defect.

This last embodiment of the method further contemplates the additional step of performing error diffusion in the horizontal and vertical direction simultaneously with the quantizing of the output to hide any quantization defect, or, performing error diffusion in the horizontal direction with the quantizing of the output to hide any quantization defect, or performing error diffusion in the vertical direction with the quantizing of the output to hide any quantization defect, or finally performing error diffusion first in the vertical direction then in the horizontal direction with the quantizing of the output to hide any quantization defect.

The invention has been described in detail with particular reference to certain preferred embodiments thereof, but it will be understood that variations and modifications can be effected within the scope of the invention.

PARTS LIST

10. Initial binary bitmap file
10a. Individual dot
10b. Individual dot
10c. Individual dot
10d. Individual dot
20. Spatial filter
20a. x direction
20b. y direction
30. Calibration curve
40. Filtered output
50. Quantized image
60. Step of performing error diffusion
70. Color printer
80. Color proof
82. Printer calibration proof
90. Printer calibration target
90a. 10% Patch
90b. 20% Patch
90c. 30% Patch
90d. 40% Patch
90e. 50% Patch
90f. 60% Patch
90g. 70% Patch
90h. 80% Patch
90i. 90% Patch
90j. 100% Patch
100a. "Off" pixels
100b. "Off" pixels
100c. "Off" pixels
110a. "On" pixels
110b. "On" pixels
110c. "On" pixels
120. Halftone dot
130a. Filtered pixel
130b. Filtered pixel
130c. Filtered pixel
140. Quantized pixel
150. Quantized pixel
160. Quantized pixel
170. Press target
180. Press calibration proof
190. Target bitmap
200. Digital tint scale
210. Printed tint scale
210a. Printed tint scale area
210b. Printed tint scale area
210c. Printed tint scale area
240. Proofer bitmap
240a. Proofer bitmap area
240b. Proofer bitmap area
240c. Proofer bitmap area
250. Horizontal line target
260. Horizontal spatial filter
270. Horizontal filtered output 280. Horizontal line press target
290. Digital horizontal line scale
300. Printed horizontal line scale
300a. Printed horizontal line scale area
300b. Printed horizontal line scale area
300c. Printed horizontal line scale area
310. Vertical line press target
320. Vertical line target
330. Digital vertical line scale
340. Printed vertical line scale
340a. Printed vertical line scale areas
340b. Printed vertical line scale areas
340c. Printed vertical line scale areas
350. Vertical spatial filter
360. Vertical filtered output
370. Spatially filtered output
380. Printing press

What is claimed is:

1. A method for printing a color proof from an initial halftone bitmap file comprising:
 a) creating a 10-75% press target from a target bitmap for a printing press from a digital file of said 10-75% press target;
 b) creating a proofer bitmap of a digital tint scale;
 c) imaging said proofer bitmap on a proofer forming a printed tint scale, wherein said printed tint scale has areas that correspond to proofer bitmap areas;
 d) measuring said tint scale areas identifying said proofer bitmap area that most closely matches said 10-75% press target;
 e) using said target bitmap with said identified proofer bitmap to create a spatial filter;
 f) sending an initial binary bitmap file to said spatial filter forming a filtered output;
 g) quantizing said filtered output to "n" levels to create a quantized image;
 h) transmitting said quantized image to a color printer; and
 i) printing said color proof on said color printer.

2. The method of claim 1, wherein said spatial filter is a two-dimensional filter.

3. The method of claim 2, wherein said two-dimensional filter filters said initial halftone bitmap file first in an "x" direction and second in a "y" direction.

4. The method of claim 2, wherein said two-dimensional filter simultaneously filters said initial halftone bitmap file in an "x" direction and second in a "y".

5. The method of claim 1, wherein the edges of said initial binary bitmap are at an exposure greater than an average exposure of said initial binary bitmap.

6. The method of claim 1, wherein said initial binary bitmap has dots and the individual dot exposure can be adjusted to be greater than the average exposure of dots in said initial binary bitmap.

7. The method of claim 1, wherein said printing press is selected from the group: sheet fed press, web fed press, single color press, and multicolor press.

8. The method of claim 1, wherein said color printer is a single pass recipe color-enabled printer.

9. The method of claim 1, wherein said "n" levels of said filtered output are at least 16 levels.

10. The method of claim 1, wherein said levels of said filtered output include the level "off".

11. The method of claim 1, further comprising the step of performing error diffusion simultaneously with said quantizing of said filtered output to hide any quantization defects.

12. A method for printing a color proof from an initial binary bitmap file comprising:
 a) creating a 10-75% horizontal line press target for a printing press having a target bitmap;
 b) creating said target bitmap from a digital file of said horizontal line press target;
 c) creating a proofer bitmap of a digital horizontal line scale;
 d) imaging said proofer bitmap on a proofer to form a printed horizontal line scale, wherein said printed horizontal line scale has areas that correspond to proofer bitmap areas;
 e) measuring said horizontal line scale areas to identify the area that most closely matches said horizontal line press target;
 f) printing a horizontal line scale from 10 to 100% on said proofer having a set of said proofer halftone bitmaps;
 g) using said target bitmap with said identified proofer bitmap area to create a horizontal spatial filter;
 h) sending said initial binary bitmap file having individual dots to a horizontal spatial filter forming a horizontal filtered output;
 i) quantizing said horizontal filtered output to "n" levels to create a quantized image;
 j) transmitting said quantized image to a color printer; and
 k) printing a halftone color proof on said color printer.

13. The method of claim 12, wherein individual dot exposure can be adjusted to be greater than the average exposure of dots in said initial halftone bitmap file.

14. The method of claim 12, wherein said printing press is selected from the group: sheet fed press, web fed press, single color press, and multicolor press.

15. The method of claim 12, wherein said color printer is a single pass recipe color-enabled printer, wherein said recipe color-enabled printer consists of:
 a) a printer with a writing resolution between 1400 and 4000 dpi;
 b) a spot size between 4 and 900 um$^2$;
 c) at least two colors each with at least 4 levels; and
 d) the ability to image said at least two colors on top of each other to form a solid recipe color.

16. The method of claim 12, wherein said "n" levels of said filtered output are at least 16 levels.

17. The method of claim 12, wherein said levels of said filtered output include the level "off".

18. The method of claim 12, further comprising the step of performing error diffusion in said horizontal direction simultaneously with said quantizing of said filtered output to hide any quantization defects.

19. A method for printing a color proof from an initial binary bitmap file comprising:
 a) creating a 10-75% vertical line press target for a printing press from a target bitmap of said vertical line press target;
 b) creating said target bitmap from a digital file of said vertical line press target from 10-100%;
 c) creating a proofer bitmap of a vertical line scale;
 d) imaging said proofer bitmap on a proofer to make a printed vertical line scale, wherein said printed vertical line scale has areas that correspond to proofer bitmap areas;
 e) measuring said vertical line scale areas;
 f) identifying said proofer bitmap that most closely matches said 10-75% vertical line press target;
 g) using said target bitmap with said identified proofer bitmap area to create a vertical spatial filter;

h) sending an initial halftone bitmap file to said vertical spatial filter forming a vertical filtered output;
i) quantizing said vertical filtered output to "n" levels to create a quantized image;
j) transmitting said quantized image to a color printer; and
k) printing a halftone color proof on said color printer.

20. The method of claim 19, wherein the edges of an initial binary image exposure is adjustable to be greater than the average exposure in said initial binary bitmap file.

21. The method of claim 19, wherein said printing press is selected from the group: sheet fed press, web fed press, single color press, and multicolor press.

22. The method of claim 19, wherein said color printer is a single pass recipe color-enabled printer.

23. The method of claim 19, wherein said "n" levels of said filtered output are at least 16 levels.

24. The method of claim 19, wherein said levels of said filtered output include the level "off".

25. The method of claim 19, further comprising the step of performing error diffusion in a horizontal direction simultaneously with the quantizing of said filtered output to hide any quantization defects.

26. A method for printing a color proof from an initial binary bitmap file comprising:
a) creating a bitmap from a digital file from first a horizontal line press target and second a vertical line press target;
b) creating a proofer map of first a digital horizontal line scale and second a vertical line scale;
c) imaging said proofer to form a printed horizontal line and said vertical line scales, wherein said printed vertical and horizontal line scales have areas that correspond to proofer bitmap areas;
d) measuring a horizontal line scale areas and vertical line scale areas to identify areas that most closely match said 10-75% horizontal line press target and said vertical line press target;
e) using a target bitmap with said identified proofer bitmaps to create a spatial filter;
f) sending an initial halftone bitmap file to said spatial filter forming a filtered output,
g) quantizing said filtered output to "n" levels to create a quantized image;
h) transmitting said quantized image to a color printer; and
i) printing a halftone color proof on said color printer.

27. The method of claim 26, wherein a printing press is selected from the group: sheet fed press, web fed press, single color press, and multicolor press.

28. The method of claim 26, wherein said color printer is a single pass recipe color-enabled printer, wherein a recipe color enabled printer consists of:
a) a printer with a writing resolution between 1400 and 4000 dpi;
b) a spot size between 4 and 900 um$^2$;
c) at least two colors each with at least 4 levels; and
d) the ability to image said at least two colors on top of each other to form said solid recipe color.

29. The method of claim 26, wherein said "n" levels of said filtered output are at least 16 levels.

30. The method of claim 26, wherein said levels of said filtered output include the level "off".

31. The method of claim 26, further comprising the step of performing error diffusion in said horizontal and vertical direction simultaneously with said quantizing of said filtered output to hide any quantization defects.

32. The method of claim 26, further comprising the step of performing error diffusion in said horizontal direction with said quantizing of said filtered output to hide any quantization defects.

33. The method of claim 26, further comprising the step of performing error diffusion in said vertical direction with said quantizing of said filtered output to hide any quantization defects.

34. The method of claim 26, further comprising the step of performing error diffusion first in said vertical direction then in said horizontal direction with said quantizing of said filtered output to hide any quantization defects.

35. A method for printing a color proof from an initial binary bitmap file comprising:
a) creating a 10-75% horizontal line press target for a printing press having a target bitmap;
b) creating said target bitmap from a digital file of said horizontal line press target;
c) creating a proofer bitmap of a digital horizontal line scale;
d) imaging said proofer bitmap on a proofer to form a printed horizontal line scale, wherein said printed horizontal line scale has areas that correspond to proofer bitmap areas;
e) measuring said horizontal line scale areas to identify the area that most closely matches said horizontal line press target;
f) identifying said proofer bitmap that most closely matches said 10-75% horizontal line press target;
g) using said target bitmap with said identified proofer bitmap area to create a vertical spatial filter;
h) sending an initial halftone bitmap file to said vertical spatial filter forming a vertical filtered output;
i) quantizing said vertical filtered output to "n" levels to create a quantized image;
j) transmitting said quantized image to a color printer; and
k) printing a halftone color proof on said color printer.

36. The method of claim 35, wherein the edges of an initial halftone image exposure is adjustable to be greater than the average exposure in said initial halftone bitmap file.

37. The method of claim 35, wherein said printing press is selected from the group: sheet fed press, web fed press, single color press, and multicolor press.

38. The method of claim 35, wherein said color printer is a single pass recipe color-enabled printer.

39. The method of claim 35, wherein said "n" levels of said filtered output are at least 16 levels.

40. The method of claim 35, wherein said levels of said filtered output include the level "off".

41. The method of claim 35, further comprising the step of performing error diffusion in said horizontal direction simultaneously with said quantizing of said filtered output to hide any quantization defects.

42. The method of claim 35, further comprising the step of performing error diffusion in said horizontal direction with said quantizing of said filtered output to hide any quantization defects.

43. The method of claim 35, further comprising the step of performing error diffusion in said vertical direction with said quantizing of said filtered output to hide any quantization defects.

44. The method of claim 35, further comprising the step of performing error diffusion first in said vertical direction then in said horizontal direction with said quantizing of said filtered output to hide any quantization defects.

* * * * *